US005445772A

United States Patent [19]

Uchida et al.

[11] Patent Number: 5,445,772

[45] Date of Patent: * Aug. 29, 1995

[54] METHOD OF PRODUCING PATTERNED SHAPED ARTICLE

[75] Inventors: Hiroshi Uchida, Ashikaga; Mituhiro Onuki, Kiryu; Hideo Watanabe, Ashikaga, all of Japan

[73] Assignee: CCA Inc., Tokyo, Japan

[ * ] Notice: The portion of the term of this patent subsequent to Nov. 29, 2011 has been disclaimed.

[21] Appl. No.: 886,842

[22] Filed: May 22, 1992

[30] Foreign Application Priority Data

May 23, 1991 [JP] Japan .................. 3-146555
Jul. 29, 1991 [JP] Japan .................. 3-210467
Feb. 26, 1992 [JP] Japan .................. 4-073022
Feb. 26, 1992 [JP] Japan .................. 4-073023

[51] Int. Cl.[6] .................. B28B 7/34; B29C 39/12; C04B 35/00; E04B 1/16

[52] U.S. Cl. .................. 264/32; 249/61; 249/112; 264/60; 264/63; 264/245; 264/317; 264/332; 264/333; 264/336

[58] Field of Search .................. 264/256, 245, 71, 247, 264/279.1, 333, 273, 313, 316, 317, 334, 336, 337, 338, 35, 56, 60, 63, 332; 249/112, 113, 84, 134, 135, 140, 203, 61, 62

[56] References Cited

U.S. PATENT DOCUMENTS 534,664 2/1895 Polivka .................. 264/245 X
537,703 4/1895 Mueller .
723,281 3/1903 Jaques .
868,261 10/1907 Geanakopulos .................. 264/245 X
1,019,414 3/1912 Bellamy .................. 264/245
1,376,321 4/1921 Crozier .................. 264/245 X
1,453,382 5/1923 D'Allessandro et al. .................. 264/245
1,524,824 2/1925 Henroz .
1,557,748 10/1925 Washington .................. 264/245
1,583,516 5/1926 Anfield .................. 264/245 X
1,597,373 8/1926 Grimm .
1,666,232 4/1928 Boynton .
1,888,492 11/1932 Dearden .................. 264/245 X
2,007,961 7/1935 Bolton .
2,420,003 5/1947 Miller .................. 249/134
2,434,477 1/1948 Winter .
3,317,644 5/1967 Takai .................. 264/263 X
3,403,484 10/1968 Redey .................. 249/134
3,423,490 1/1969 Trogdon et al. .................. 264/245 X
3,492,391 1/1970 Van Atten .................. 264/245
3,504,063 3/1970 Lemelson .................. 264/245 X
4,275,028 6/1981 Cohen .................. 264/245 X
4,415,516 11/1983 Krueger et al. .................. 249/84 X

FOREIGN PATENT DOCUMENTS 0000837 2/1979 European Pat. Off. .
0374956 6/1990 European Pat. Off. .
0479512 4/1992 European Pat. Off. .
667109 10/1929 France .
635156 9/1936 Germany .
0087534 7/1980 Japan .................. 264/245

*Primary Examiner*—Karen Aftergut
*Attorney, Agent, or Firm*—Oblon, Spivak, McClelland, Maier, & Neustadt

[57] ABSTRACT

A method of producing a patterned shaped article includes the steps of disposing at a prescribed position within a main form for molding the shaped article a projection-bristling form having a support member and a plurality of projections standing upright from the support member, charging a prescribed amount of dry pattern-course material for forming the pattern course of the shaped article into spaces defined by a prescribed number of projections of the bristling form, charging a base-course material for forming the base course of the shaped article into the main form including the remaining space of the bristling form not filled with the pattern-course material, removing the bristling form, causing the charged pattern-course material and base-course material to set into a shaped article, removing the shaped article from the main form and, optionally, sintering the shaped article.

36 Claims, 10 Drawing Sheets

METHOD OF PRODUCING PATTERNED SHAPED ARTICLE

BACKGROUND OF THE INVENTION

1. Field of the Invention

This invention relates to a method of producing patterned shaped articles including shaped concrete articles and shaped artificial stone articles such as paving blocks and the like used for surfacing sidewalks and roads and such as wall, ceiling and floor slabs used for building purposes; shaped ceramic articles including shaped new-ceramic articles such as paving tiles, wall tiles, porcelain wares, sintered rock, glass, flameproof materials and other structural materials; and shaped glass articles including enameld ware and the seven treasures.

2. Description of the Prior Art

The conventional method of providing a paved surface constituted of paving blocks with a pattern indicating, for example, a crosswalk, a stop intersection or other such traffic control mark has been either to apply paint to the surface in the desired pattern or to inlay the surface with another material in the desired pattern. On the other hand, the patterning of ceramic material surfaces has conventionally been carried out exclusively by pattern transfer, printing or inlaying.

Since the patterns painted on the surface of paving blocks are exposed to abrasion from pedestrians' shoes and/or vehicle tires and the like, they quickly wear off and have to be redone at frequent intervals, at a considerable cost in terms of labor and materials. Where the pattern is formed by inlaying, the work itself is troublesome and very costly.

In view of the aforementioned drawbacks, the inventors proposed methods for the production of patterned shaped articles using an auxiliary frame in a main form (Ser. No. 07/750,618) and using a cell form in a main form (Ser. No. 07/767,815). However, the former method requires a plurality of auxiliary frames corresponding to a desired number of patterns and the latter makes it difficult to form a smooth curve at the boundary between adjacent patterns.

SUMMARY OF THE INVENTION

One object of the present invention is to provide a method for easily producing patterned shaped articles capable of maintaining their patterns in excellent condition even when exposed to surface abrasion.

Another object of the invention is to provide a method for producing patterned shaped articles capable of faithfully forming a desired pattern even when the pattern consists of fine and thin constituents.

For realizing this object, the present invention provides a method of producing a patterned shaped article comprising the steps of disposing at a prescribed position within a main form for molding the shaped article a form with bristling projections (hereinafter referred to as the "bristling form") having a plurality of projections of the same height standing upright from a support member, charging a prescribed amount of dry material for pattern-course formation into spaces defined by the prescribed number of projections of the bristling form, charging a base-course material for forming the base course of the shaped article into the remaining space of the main form not filled with the pattern-course material, optionally removing the bristling form by a suitable method, causing the charged pattern-course and base-course materials to set into a shaped article, removing the shaped article from the main form and, optionally, sintering the shaped article.

When a pattern-course material and a base-course material consisting mainly of cement and/or resin are charged into the space defined by the prescribed number of projections of the bristling form within the main form and allowed to set into an integral mass by virtue of their water content, there is obtained a patterned concrete shaped article.

When a pattern-course material and a base-course material consisting mainly of aggregate are charged into the space defined by the prescribed number of projections of the bristling form within the main form and caused to set into an integral mass by use of a curing material, there is obtained a patterned artificial stone shaped article.

Moreover, when a pattern-course material and a base-course material consisting mainly of sinterable material are charged into the spaces defined by the prescribed number of projections of the bristling form within the main form, the charged materials are formed under pressure into a raw product, and the unmolded raw product is sintered, there is obtained a patterned ceramic shaped article.

Furthermore, pattern-course and base-course materials consisting mainly of glass material are charged into the spaces defined by the prescribed number of projections of the bristling form within a refractory setter used as the main form. The charged materials are thermally melted or fused within the main form and allowed to set into an integral mass. The integral mass is removed from the main form. As a result, there is obtained a patterned glass shaped article.

Since the pattern course of the patterned shaped article produced according to the method of this invention can be formed to whatever thickness is desired, the pattern does not wear off or become unsightly even when the surface of the shaped article is subjected to abrasion or fouling. In addition, the bristling form having a plurality of projections is disposed at a prescribed position within the main form and a base-course material and a pattern-course material can be charged into the space defined by the prescribed number of projections by use of one or more masks or the like and, therefore, it becomes possible to easily produce even complexly patterned shaped articles without either mixing the adjacent materials or disintegrating the formed pattern owing to a so-called bridging phenomenon of the materials between the projections.

The above and other features of the invention will become apparent from the following description made with reference to the accompanying drawings.

DESCRIPTION OF THE PREFERRED EMBODIMENTS

Figure 1:
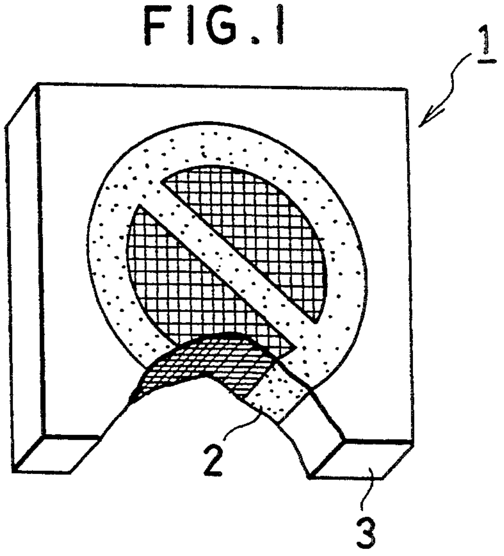
FIG. 1 is a partially cutaway perspective view of a first embodiment of a patterned shaped article produced according to the method of the invention.
Figure 2:
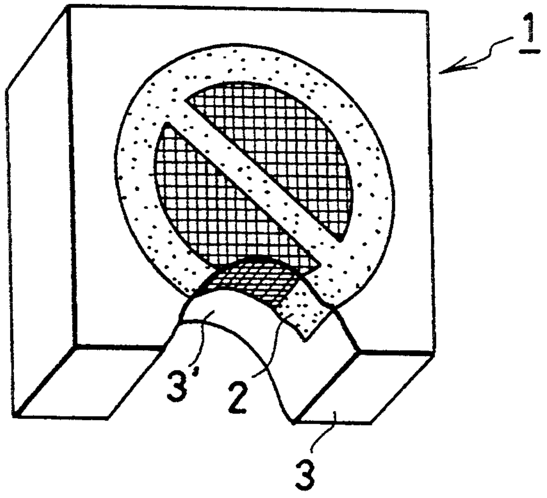
FIG. 2 is a partially cutaway perspective view of a second embodiment of a patterned shaped article produced according to the method of the invention.
Figure 3:
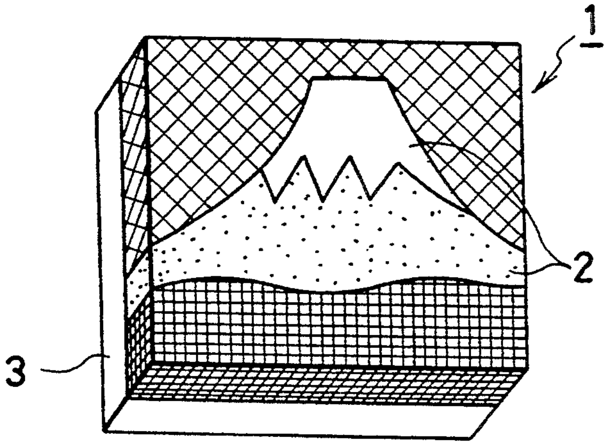
FIG. 3 is a perspective view of a third embodiment of a patterned shaped article produced according to the method of the invention.

FIGS. 1, 2 and 3 respectively show patterned shaped articles 1 produced according to first, second and third embodiments of the present invention. FIGS. 1 and 2 show examples having a traffic control mark, and FIG. 3 shows an example having a pattern of Mt. Fuji.

Figure 5:
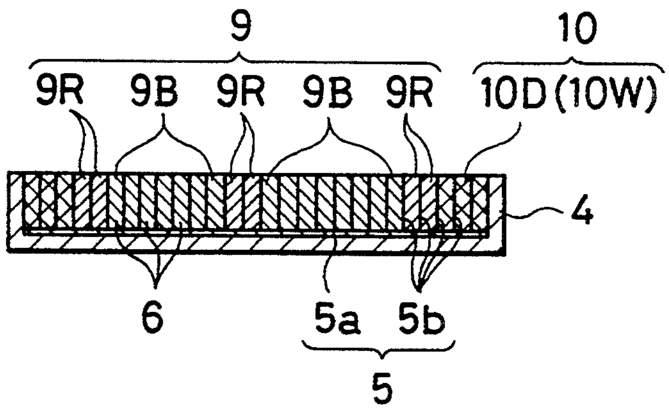
FIG. 5 is a sectional view showing the mode in which the shaped article of FIG. 1 is produced.
Figure 6:
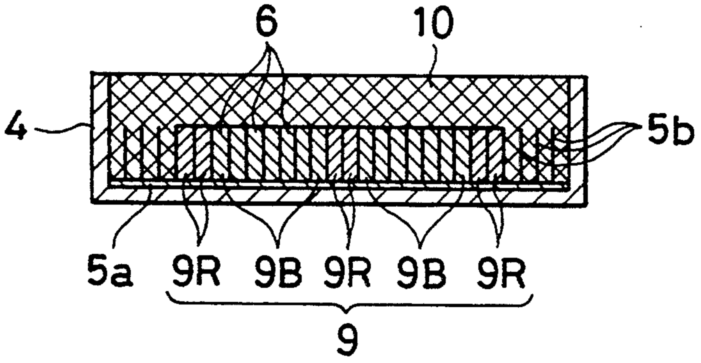
FIG. 6 is a sectional view showing an example of the mode in which the shaped article of FIG. 2 can be produced.

The shaped article 1 of FIG. 1 is formed of a pattern course 2 and a base course 3 which are of equal thickness. The pattern course 2 is exposed at specific portions of the shaped article surfaces. As will be explained in greater detail later, this shaped article is produced by charging a space 6 defined by a prescribed number of projections 5*b* of a bristling form 5 disposed within a main form 4 with a dry pattern-course material 9 of prescribed thickness and charging a space 6 defined by the remaining projections 5*b* and not filled with the pattern-course material 9 with a base-course material 10 of the same thickness (FIG. 5). In the case of the shaped article 1 of FIG. 2, the pattern course 2 is exposed at a specific portion on the front surface of the shaped article 1, while the rear surface of the shaped article is formed solely of the base course 3. Specifically, the portion 3' of the base course 3 located underneath the pattern course 2 is relatively thin while the portion thereof that is also exposed on the front surface is thick. As will be explained in greater detail later, the shaped article of FIG. 2 is produced by charging the space defined by the prescribed number of projections 5*b* of the bristling form 5 disposed within the main form 4 with a dry pattern-course material 9 in a prescribed amount and charging all of the space within the main form inclusive of the space charged with the pattern-course material 9 with a base-course material 10 in a prescribed amount (FIG. 6).

Figure 8:
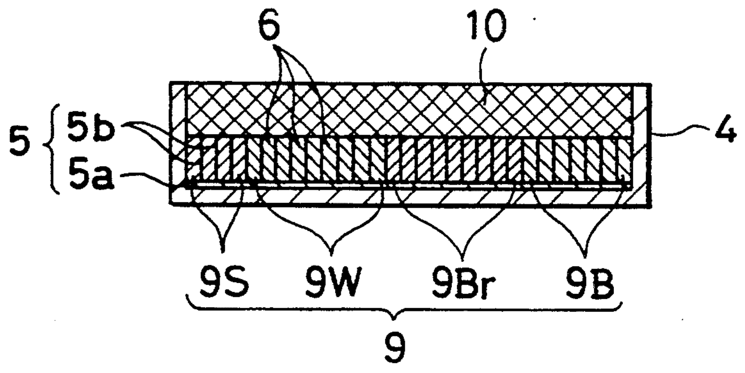
FIG. 8 is a sectional view showing the mode in which the shaped article of FIG. 3 is produced.

In the shaped article 1 of FIG. 3, the pattern course 2 is exposed over the whole front surface and the rear surface is formed of the base course 3, which is not exposed at the front surface. As will be explained in further detail later, this shaped article is produced by charging the space 6 defined by all the projections 5*b* of the bristling form 5 disposed within the main form 4 with dry pattern-course materials 9S, 9W, 9Br and 9B having different colors in their respectively prescribed amounts and then charging the remaining space 6 with base-course material 10 on the pattern-course materials (FIG. 8). The order of the charging operations of the pattern-course material 9 and base-course material 10 can be freely selected in the production of all shaped articles according to this invention.

When, a pattern-course material is inadvertently charged at the wrong location, the mistake can easily be remedied since the pattern-course material 9 is dry at the time of being charged into the bristling form and can thus be sucked up and removed by means of a vacuum cleaner type apparatus.

Figure 4:
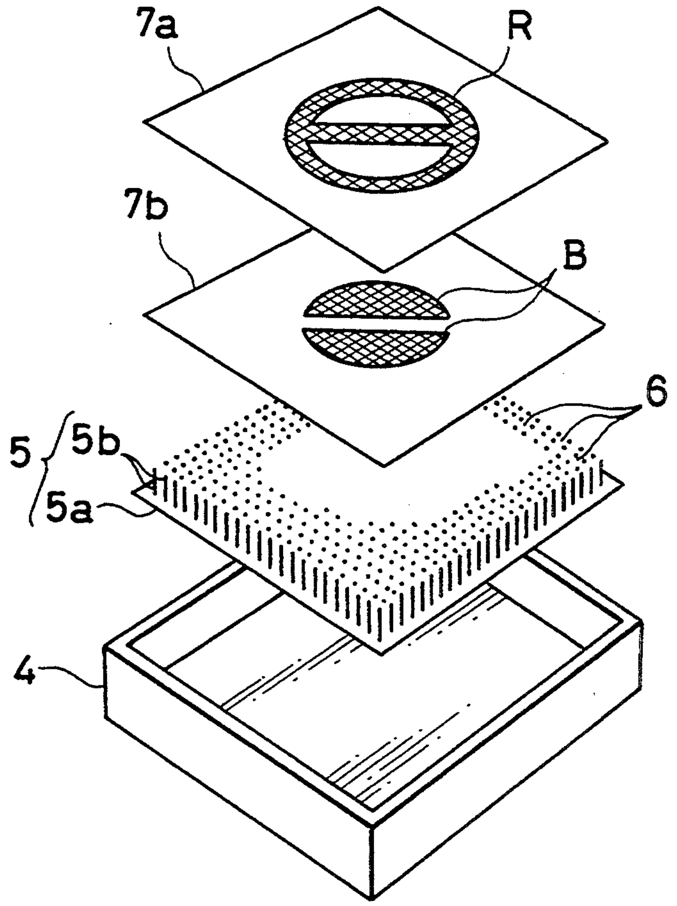
FIG. 4 is a perspective view of a main form, a bristling form and masks used for producing the shaped article of FIG. 1.

The shaped articles which, as shown in FIGS. 1, 2 and 3, have their pattern courses 2 exposed at all or a part of their front surfaces are produced by using a main form 4 and a bristling form 5 having a plurality of projections 5*b* of the same height standing upright from the surface of a support member 5*a*, as shown in FIG. 4 and making the pattern course 2 of dry pattern-course material and the base course 3 of base-course material.

The support member 5*a* of the bristling form 5 is a sheet of metal, plastic, rubber, wood, paper, knit fabric, woven fabric or unwoven fabric and includes a netted sheet of the same material. For easy illustration, the projections 5*b* standing upright from the support member 5*a* are shown in FIG. 4 in the form of thin pins. Instead, however, they may be in any of various other forms such as sticks, pipes, pieces, standing fibers or filaments (which can be of the implanted, raised or attached type), or pipe or loops formed by knitting or weaving. The projections 5*b* desirably with high density and have a height the same as or larger than the thickness of a pattern course to be formed. They are about 10 μm to 10 mm thick in the case of fiber or pin projections, about 1 mm to 50 mm wide and about 10 μm to 5 mm thick in the case of piece projections, and have a diameter of about 1 mm to 20 mm in the case of pipe projections. The bristling form 5 has a size conforming to the inside size of the main form 4. However, it need only have a size slightly larger than the outer configuration of a pattern to be formed. The bristling form 5 may be divided into a plurality of small bristling forms having different projection densities for a small or a complexed pattern. The small bristling form is accommodated at a prescribed position within the main form 4.

In the case of producing a concrete shaped article, the pattern-course material 9 charged in spaces 6 defined by the projections 5*b* of the bristling form 5 within the main form 4 is cement powder, resin or a mixture thereof and may additionally include at least one of a pigment and fine aggregates. Although the material may have absorbed some moisture after drying, it is not kneaded with water and is in a state readily amenable to pulverization before charging. On the other hand, the concrete base-course material 10 consists mainly of cement powder, resin or a mixture thereof and may additionally include fine aggregates. In the finished state it is required to differ from the pattern-course material in color, luster, texture and the like, and for this purpose may, if necessary, contain a pigment and either or both of coarse aggregate and fibers selected from among various types of fibers that can be used. The material may be one which has absorbed some moisture after drying but is not kneaded with water and is in a state readily amenable to pulverization before charging. Alternatively, it can be in the form of a concrete slurry obtained by kneading with water. In addition to the aforesaid components, both the pattern-course material and the base-course material may, as found necessary, further have mixed therewith one or more of crushed or pulverized granite, crushed or pulverized marble, ceramic, slag, minute light-reflecting particles and the like. They may also contain one or more of a congealing and curing promoter, a waterproofing agent, an inflating agent and the like. The aforesaid various kinds of usable fibers include metal fibers, carbon fibers, synthetic fibers, glass fibers and the like. All of the materials to be charged into the spaces of the bristling form are of a particle size or are formed into a state enabling them to be charged into the spaces.

The method for producing a concrete shaped article using the aforesaid pattern-course material and base-course material will now be explained. Where the projections 5*b* of the bristling form 5 are made of metal, plastic, rubber, wood, paper, knit fabric, woven fabric, non-woven fabric, fiber or other such water insoluble material, the support member 5*a* alone or along with the projections 5*b* is removed from the shaped article. However, in the case of removing the support member 5*a* alone, it is desirable that the support member 5*a* be made of a water soluble material, that the projections 5*b* be constructed or made of a material such that they can easily be cut off the support member 5*a*, or that an adhesive agent for attaching the projections 5*b* to the support member 5*a* be made soluble in water. In the case of removing the support member 5*a* along with the projections 5*b*, the projections 5*b* desirably have tapered ends so that easy removal thereof from the shaped article can be attained. When the bristling form is accommodated in the main form as held upside down or has a netted support member, the bristling form may be removed before the materials are allowed to set. In removing the bristling form by extracting the projections from the shaped material, one or both of the main form and the bristling form are caused to vibrate by a vibrator or with ultrasonic waves to promote the cave-in and filling-up action of the materials for the space left by the removal of the projections.

Where a sheet bristling form is used, by warping the form in the direction of widening the spaces between the projections to positively form gaps between the materials and the projections, it is possible to remove the bristling form more quickly.

For producing the shaped article shown in FIG. 1 a dry red pattern-course material 9R is charged into the space defined by the projections 5*b* of the bristling form 5 set in the main form 4 as shown in FIG. 5 in the pattern of a circle and a straight line diagonally intersecting the circle, a dry blue pattern material 9B is charged into the space inside the circle exclusive of the straight line, and a dry or wet base-course material 10D or 10W is charged into the space outward of the circle. All of the materials are charged to the same thickness. They can be charged in any desired order. On completion of material charging, the bristling form is removed from the main form. If a dry base-course material 10D was charged, water is then supplied to all portions of the main form interior in such amount as to obtain a prescribed water ratio with respect to the total amount of cement or resin contained in the base-course material 10 and the pattern-course materials 9R and 9B. This water serves to cause the pattern-course materials 9R and 9B and the base-course material 10D to set into an integral shaped article. If a wet base-course material 10W was charged, the same effect is obtained by virtue of the water contained therein without supply of additional water. After the materials have set, the main form 4 is removed.

Figure 7:
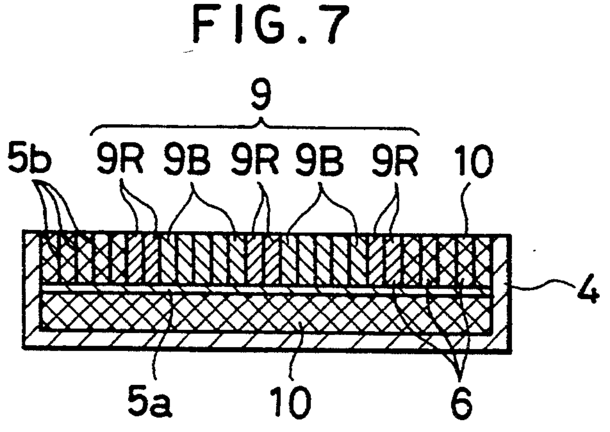
FIG. 7 is a sectional view showing another example of the mode in which the shaped article of FIG. 2 can be produced.

As shown in FIG. 6, for producing the shaped article shown in FIG. 2 dry pattern-course materials 9R and 9B are charged into the space defined by some of the projections 5*b* of the bristling form 5 within the main form 4 to a thickness that is less than the overall thickness of the shaped article to be produced, whereafter a dry or wet base-course material 10D or 10W is charged to a prescribed thickness both in the remaining space and on top of the pattern-course materials 9R and 9B. If a dry base-course material 10D was used, water is supplied to all of the materials for causing them to set into an integral shaped article, which is then removed from the main form. If a wet base-course material 10W was used, the same effect is obtained by virtue of the water contained therein without supply of additional water. Alternatively, as shown in FIG. 7, a thin layer of the base-course material 10D or 10W is first charged throughout the base form, a bristling form 5 having a water soluble support member 5*a* is placed on the layer, the pattern-course materials 9R and 9B are then charged to a prescribed thickness into the space defined by some of projections of the bristling form 5, and finally, the base-course material 10D or 10W is charged to a prescribed thickness into the remaining space of the bristling form. Then all of the materials are caused to set into an integral shaped article by supplying water thereto in the case of using a dry base-course material 10D or, if a wet base-course material 10W was used, by virtue of the water content thereof. Alternatively, a thin layer of the dry or wet base-course material is charged throughout the base form, then the dry pattern-course material is charged into the space defined by some of the projections of the bristling form placed outside the main form and the base-course material is charged into the space defined by the remaining projections, the bristling form is covered with a sheet or plate member, turned upside down with the charged materials held stable, and placed within the main form while the sheet or plate member is removed, and finally all of the materials are caused to set into an integral shaped article by supplying water thereto in the case of using a dry base-course material or, if a wet base-course material was used, by virtue of the water content thereof. In this case, the sheet or plate member desirably has a surrounding frame in order to make it easy to turn the bristling form upside down. When a thin or water-soluble surrounding frame is used, it is unnecessary to remove. Similarly when the sheet or plate member is made of a water soluble material, it is unnecessary to remove. In this case, the bristling form may be removed before the materials are allowed to set as described above.

As shown in FIG. 8, for producing the shaped article shown in FIG. 3, a dry white pattern-course material 9W for representing the snow covered peak of a mountain, a dry brown pattern-course material 9Br for representing the side of the mountain, a dry blue pattern-course material 9B for representing the sea, and a dry sky-blue pattern-course material 9S for representing the sky are charged into the corresponding spaces 6 defined by the projections 5*b* of the bristling form 5 within the main form 4 to a thickness less than that of the final product shaped article to be produced. Next, a dry or wet base-course material 10D or 10W is charged throughout the interior of the main form in such amount as to obtain a final shaped article product of the desired thickness. Alternatively, the wet or dry base-course material 10D or 10W can first be charged throughout the interior of the main form, the bristling form 5 is then placed on the base-course material and the dry pattern-course materials 9W, 9Br, 9B and 9S are thereafter charged into the corresponding spaces 6 of the bristling form 5. If a dry base-course material was used, water is supplied in a prescribed amount throughout the form to cause the materials to set into an integral shaped article. If a wet base-course material was used, the same effect is obtained by virtue of the water contained therein without supply of additional water.

The bristling form 5 has a size conforming to the inside size of the main form 4 in the illustrated embodiment. However, it may have a size slightly larger than the outer configuration of a pattern to be formed. In other words, the size of the bristling form does not necessarily conform to the inside size of the main form. If the formation of steps on the surface of a shaped article to be obtained, resulting from the presence of the support member of the bristling form, should be undesirable, a water soluble support member may be used.

The pattern-course and base-course materials are charged into the spaces defined by the projections manually or by means of an industrial robot and, in order to effect accurate and rapid charging, it is desired to use a mask having the same size as that of the bristling form and having an opening corresponding to a pattern to be formed.

To be specific, the pattern of the shaped articles 1 shown in FIGS. 1 and 2 comprises a red portion and a blue portion and, therefore, as shown in FIG. 4, a mask 7*a* having an opening R corresponding to the red portion and a mask 7*b* having an opening B corresponding to the blue portion are used. The two masks 7*a* and 7*b* have the same size as that of the bristling form 5 and are precisely aligned on the bristling form 5 to form a red and blue pattern.

To be specific, the pattern can be formed by placing one of the masks 7*a*, for example, on the surface of the bristling form 5, charging a red pattern-course material 9R into the space 6 defined by a prescribed number of projections through the opening R of the mask 7*a*, removing the mask 7*a*, then placing the other mask 7*b* on the surface of the bristling form 5, charging a blue pattern-course material 9B in the space defined by a prescribed number of projections through the opening B of the mask 7*b*, removing the mask 7*b* and charging the base-course material into the remaining space. Thus, by the use of the masks the materials can easily be charged rapidly into the spaces with exactitude.

As was explained earlier, in the case where a dry base-course material 10D is used, water is appropriately supplied to all portions of the main form interior in such amount as to obtain a prescribed water ratio with respect to the total amount of cement or resin contained in the base-course material and the pattern-course materials. In this connection, it is possible to supply the amount of water for specified regions in advance of other regions so as to better regulate movement between the different material regions. On the other hand, where a wet base-course material 10W is used, since the moistening of the pattern-course materials is realized mainly by virtue of the water content of the base-course material, the water content of the base-course material has to be adjusted in advance in light of the amount of water required both by itself and by the pattern-course materials. Where the water content of the base-course material is insufficient for appropriately moistening the pattern-course materials, water can of course be added to these materials.

While it suffices for the height of the projections 5*b* of the bristling form 5 to be equal to the thickness of the pattern-course materials to be charged therebetween, it is generally more convenient for the projections 5*b* to be made lower than the height of the main form 4 and higher than the thickness of the pattern-course materials.

After removal of the shaped article from the main form, the support member alone or along with the projections is removed from the shaped article. In the case of removing the support member alone, the projections are colored in advance so as to be harmonized with the colors of the pattern-course materials thereby to obtain a good appearance of a pattern layer to be formed. If the projections should remain projected from the surface of the shaped article, they may be cut off. However, they can be removed with ease by slightly heating the surface of the shaped article if they were made of plastic or fiber having a low melting point. In the case of using a water soluble support member, the eluate of the support member may be wiped away from the surface of the shaped article. In the case of using a water soluble adhesive agent for attaching the projections to the support member, the adhesive agent eluting after removal of the support member may be wiped out.

In the case of using a main form having a bottom plate and a surrounding frame separable from each other, the bristling form 5 is placed on the bottom plate and, as shown in FIG. 5, 6 or 8, the pattern-course materials 9 and base-course material 10 are then charged into the corresponding spaces 6, whereafter the main and bristling forms are turned upside down using a sheet or plate member. In this state, the bottom plate and the bristling form are successively removed and the charged materials are allowed to set or caused to set into an integral product by the water contained in the base-course material or the water supplied to one or both of the base-course material and pattern-course materials within the surrounding frame. The integral is removed from the surrounding frame.

The pattern-course materials are charged beforehand into the corresponding spaces of the bristling form 5 disposed outside the main form, and the bristling form is covered with a sheet or plate member, turned upside down and placed within the main form as shown in FIG. 6 or FIG. 8. The sheet or plate member and the bristling form are removed depending on the circumstances, and the base-course material is then charged. All the materials are allowed to set or caused to set into an integral product by the water contained in the base-course material or the water supplied to one or both of the base-course material and the pattern-course materials. The integral product is then removed from the main form. Otherwise, within the base form into which the base-course material has been charged in advance as shown in FIG. 7, the bristling form filled with the pattern-course materials and turned upside down is placed. Then, the materials are allowed to set or caused to set into an integral product by the water contained in the base-course material or the water supplied to one or both of the base-course material or the pattern-course materials. In turning the bristling form upside down, it is preferable to use a thin surrounding frame. The frame is removed if it is made of a water insoluble material or is unnecessary to remove if it is made of a water soluble material.

In the foregoing embodiments, the bristling form 5 was described as being formed of a material that is not soluble in water. Alternatively, however, it is also possible to use a bristling form constituted of water soluble fiber or other water soluble material. The method of producing a shaped concrete article using a water soluble bristling form is substantially the same as that in the aforesaid embodiments using an insoluble bristling form, the only difference being that there is no need for removing the bristling form from the main form since the bristling form is dissolved by the supplied water or the water contained in the material so that the materials that were separated by the projections of the bristling form 5 (which may be pattern-course materials on both sides or a pattern-course material on one side and the base-course material on the other) cave into and fill up the spaces left by the dissolution of the bristling form. For promoting this cave-in action, the materials can be subjected to vibration and/or pressure.

If it is desirable for the bristling form to dissolve at an early stage, this can be realized by supplying water to the pattern-course materials immediately after charging of these materials has been completed, and thereafter charging the base-course material. In this case, if a dry base-course material is used, the amount of water supplied thereto after it is charged is made less than it would otherwise be. If a wet base-course material is used, the water content thereof is similarly reduced. If it is desirable to charge a wet base-course material in advance of the pattern-course materials, there is used a bristling form made of a water soluble material that takes a relatively long time to dissolve because, otherwise, the bristling form is liable to dissolve before the charging of the pattern-course material can be completed. Since the bristling form dissolves within the main form and does not have to be removed, it is preferable to give its projections a height equal to the thickness of the pattern-course materials to be charged therein. Specifically, there is no need for them to project above the upper surface of the main form.

In any of the aforesaid methods of producing a concrete shaped article, by causing the support member 5*a* to bristle with slender projections 5*b* to constitute a bristling form, a complex pattern can be obtained. The materials can be charged at higher density and as more finely packed by placing the main form on a table and subjecting it and the bristling form to vibration during the charging of both the pattern-course materials and the base-course material by use of a vibrator or ultrasonic oscillator. The density of the charged materials between the projections can be further enhanced by pressing the materials with a press when the materials are set.

Figure 9:
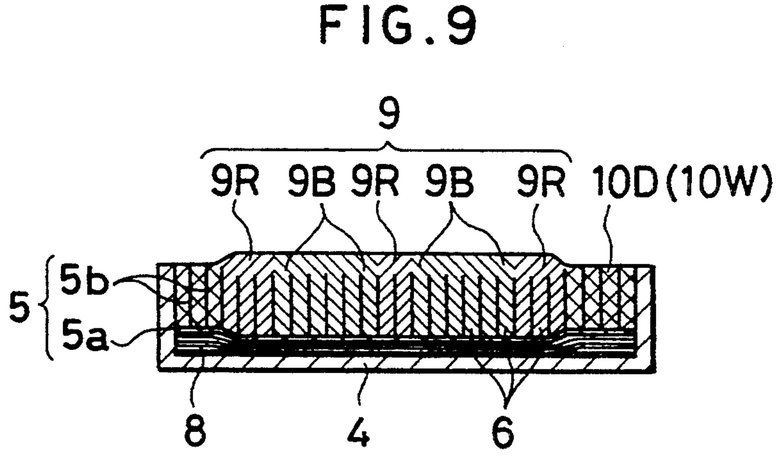
FIG. 9 is a sectional view of the mode in which a shaped article is produced using a main form having a thick mat on the floor thereof.

FIG. 9 shows a case in which a thick, compressible mat 8 of non-woven fabric or the like is laid on the floor of the main form 4 and a bristling form 5 having a flexible support member 5*a* is placed on top of the mat 8. A bristling form 5 having a thick, compressible support member 5*a* may instead be laid on the floor of the main form 4. An inflating agent is added to one or more of the dry pattern-course materials 9R and 9B to be charged into the bristling form 5 and the base-course material 10D or 10W to be charged (in the illustrated example, the inflating agent was added to the pattern-course materials 9R and 9B). During setting, the material(s) containing the inflating agent swell and depress the mat 8 or thick support member 5*a*. As a result, the surfaces of the pattern course and base course of the final shaped article rises above the general surface level of shaped article, giving the pattern a three-dimensional appearance. While in the illustrated example the main form 4 is open at the top, a more pronounced three-dimensional effect can be realized by covering the top of the main form 4 with a heavy lid so as to ensure that the swelling of the materials will occur mainly in the direction of the mat 8 or thick support member 5*a*. Moreover, if a mat 8 made of a water absorbing material is used, the mat will absorb any excess water and work to ensure that the water content of the different materials is maintained uniform, thereby improving the strength properties of the shaped article product. The same results can be obtained if the support member 5*a* of the bristling form 5 serves concurrently as a mat.

While the product produced in the manner of FIG. 9 is similar to that of the embodiment of FIG. 5, it is also possible to apply similar techniques to obtain products similar to those produced in the manner of FIGS. 6 to 8 but having patterns with a three-dimensional appearance. In the case of FIG. 7, on the other hand, since the pattern-course materials are charged on top of the previously charged base-course material 10D or 10W, it is possible to cause the pattern course to rise above the general surface level of the shaped article even without using a thick mat by, for example, mixing an inflating agent into the pattern-course materials. In this case also, the strength properties of the shaped article product can be improved by laying a water absorbing mat on the floor of the main form before the insertion of the bristling form.

The invention can be applied not only to the production of a block-like patterned concrete shaped article as described in the foregoing but also to a method for decorating the surface of an existing concrete surface by bonding a patterned concrete shaped article thereto. This method will now be explained.

Figure 10:
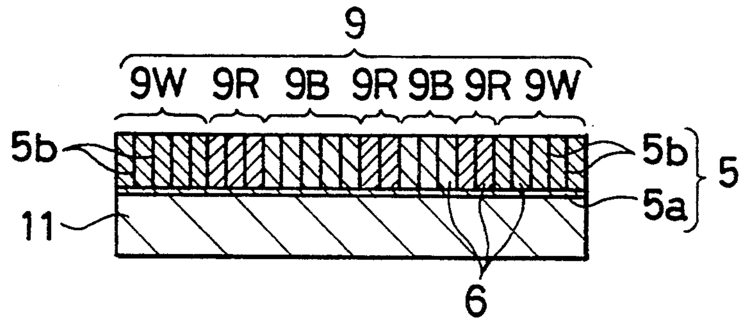
FIG. 10 is an explanatory view of an example in which an existing concrete surface has been ornamented with a patterned shaped article produced according to the method of the invention.

Specifically, FIG. 10 shows an embodiment in which the surface of an existing concrete body 11 is decorated with the patterned shaped article 1 of FIG. 1 by use of a projection-bristling form 5 having a water soluble support member 5*a*. This is attained by placing the support member 5*a* of the bristling form 5 on the surface of the existing concrete body 11 to be decorated, charging a dry red pattern-course material 9R into the space 6 defined by a prescribed number of projections 5*b* of the bristling form 5 in the pattern of a circle and a straight line diagonally intersecting the circle, charging a dry blue pattern material 9B into the space 6 inside the circle exclusive of the straight line, and charging a dry white pattern-course material 9W into the space 6 outward the circle. All of the materials are charged to the same thickness. On completion of material charging, water is supplied to the pattern materials 9 in such amount as to obtain a prescribed water ratio with respect to the total amount of cement or resin contained in the pattern-course materials 9R, 9B and 9W. This water serves to dissolve the support member 5*a* of the bristling form 5 and cause the pattern-course materials 9R, 9B and 9W and the existing concrete body 11 to form into an integral shaped article.

Figure 11:
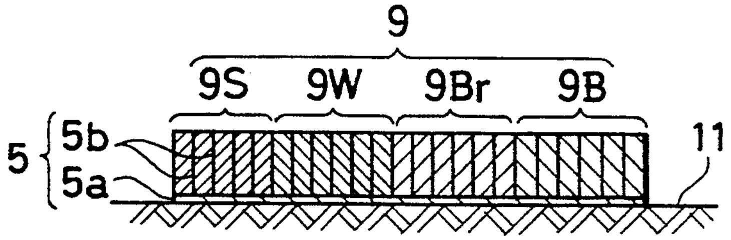
FIG. 11 is an explanatory view of an example in which a patterned shaped article produced according to the method of the invention has been fixed to an existing concrete surface.

FIG. 11 shows an embodiment in which the surface of an existing concrete body 11 is decorated with the patterned shaped article 1 of FIG. 3 by use of a projection-bristling form 5 having a water soluble support member 5*a*. This is attained by placing the support member 5*a* of the bristling form 5 on the surface of the existing concrete body 11 to be decorated, charging a dry white pattern-course material 9W for representing the snow covered peak of a mountain, a dry brown pattern-course material 9Br for representing the side of the mountain, a dry blue pattern-course material 9B for representing the sea and a dry sky-blue pattern-course material 9S for representing the sky into the corresponding spaces 6 defined by the projections 5*b* of the bristling form 5 to the same thickness, and supplying a prescribed amount of water to the respective pattern-course materials in the same manner as described above, thereby dissolving away the support member 5*a* of the bristling form 5 and causing the pattern-course materials 9W, 9Br, 9B and 9S and the existing concrete body 11 into an integral shaped article.

In the aforementioned embodiments, the projections 5*b* of the bristling form 5 may be either soluble or insoluble in water. In the case of using water soluble projections 5*b*, they and the support member 5*a* will be dissolved away. In the case of using water insoluble projections 5*b*, they will remain in the pattern layer, but will not raise any problem. If the projections 5*b* should project from the surface of the pattern layer, they may be cut off. However, they can be easily removed by slightly heating the surface of the pattern layer if they were made of plastic or fiber having a low melting point.

Figure 12:
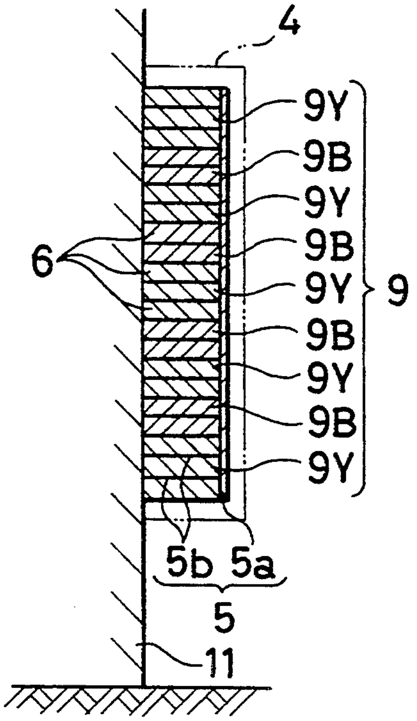
FIG. 12 is an explanatory view of an example in which a patterned shaped article produced according to the method of the invention has been fixed to an existing upright concrete wall surface.

In the case of using a bristling form 5 having a water insoluble support member 5*a*, dry pattern-course materials of different colors are charged into the corresponding spaces 6 defined by the projections 5*b* of the bristling form 5 and supplied with water until they have set to a certain extent, whereafter the surface of the charged materials opposite the support member 5*a* is pressed against the surface of the existing concrete body 11 and bonded with the existing concrete surface. The bristling form 5 is then removed. Otherwise, the bristling form 5 is removed when the charged materials have set to a certain extent, the somewhat set materials are then pressed against and bonded with the existing concrete surface. This method therefore provides a simple way of decorating not only flat concrete surface but also cylindrical, wavy and other non-flat concrete surfaces and even a vertical wall surface as shown in FIG. 12.

When the surface of the charged materials is pressed against and bonded with the existing concrete surface, a bottomless main form 4 is advantageously used to prevent disintegration of the pattern layer and enhance the operability.

Where the shaped article is to be constituted of ceramic material including new ceramic material, the dry pattern-course material 9 may, for example, be constituted of one or more of clay, rock particles, rock granules, glass particles, glass granules, glaze, new ceramic particles and new ceramic granules, with or without a pigment or colorant added thereto. The material may be one which has absorbed some water or been added with a lubricant/bonding agent after drying but it is not kneaded with water or the lubricant/bonding agent and is in a state readily amenable to pulverization. The base-course material 10 may, for example, be constituted of one or more of clay, rock particles, rock granules, glass particles, glass granules, new ceramic particles and new ceramic granules, with or without a pigment or colorant added thereto. In the finished state it is required to differ from the pattern-course material in color, luster, texture and the like. The material may be one which has absorbed some moisture or been added with a lubricant/bonding agent after drying but is not kneaded with water or the lubricant/bonding agent and is in a state readily amenable to pulverization before charging. Alternatively, it can be a wet material obtained by kneading with water or lubricant. In addition to the aforesaid components, both the pattern-course material and the base-course material may, as found necessary, further have mixed therewith granular or powdered ceramic material, granular or powdered metal or other minerals, and may also contain one or more lubricants, bonding agents and other additives.

For producing the raw product for a ceramic shaped article using the aforesaid pattern-course materials 9 and base-course material 10, a bristling form 5 having projections 5*b* made of metal, plastic, rubber, wood, paper, knit fabric, woven fabric, non-woven fabric or fiber is used. After the raw material is molded by pressing in the bristling form 5 within a main form and subjected to setting, the support member 5*a* alone or along with the projections 5*b* is removed from the shaped article. However, in the case of removing the support member 5*a* alone, it is desirable that the support member 5*a* be made of a material soluble in water or a solvent, that the projections 5*b* be constructed or made of a material such that they can easily be cut off the support member 5*a*, or that an adhesive agent for attaching the projections 5*b* to the support member 5*a* be made soluble in water. In the case of removing the support member 5*a* along with the projections 5*b*, the projections 5*b* desirably have tapered ends so that easy removal thereof from the shaped article can be attained. In the case of the bristing form filled with the materials and disposed upside down within the main form or the bristling form having a netted support member, the raw material may be molded by pressing after removal of the bristling form. At the time of removing the bristling form, it is preferable to vibrate one or both of the bristling form and the main form by use of a vibrator or ultrasonic oscillator as this regulates the cave-in action of the materials and thus promotes the filling in of the spaces formed by extraction of the bristling form.

Where a sheet bristling form is used, by warping the form in the direction of widening the spaces between the projections to positively form gaps between the materials and the projections, it is possible to remove the bristling form more quickly.

For producing the raw product for the ceramic shaped article shown in FIG. 1 a dry pattern-course material 9R which becomes red upon sintering is charged into the space 6 of the bristling form 5 disposed inside the main form 4 representing a circle portion and a straight line portion diagonally intersecting the circle portion, a dry pattern-course material 9B which becomes blue upon sintering is charged into the space 6 representing the portion enclosed by the circle and straight line portions, and a dry or wet base-course material 10D or 10W is charged into the portion outside of the circle portion. All of the materials are charged so as to have the same thickness. They can be charged in any desired order. The projections 5*b* of the bristling form have substantially the same height as the depth of the main form as shown in FIG. 5.

As shown in FIG. 6, for producing the raw product for the ceramic shaped article shown in FIG. 2, dry pattern-course materials 9R and 9B are charged into the space 6 defined by some of the projections 5*b* of the bristling form 5 within the main form 4 to a thickness that is less that the overall thickness of the raw product to be produced, whereafter a dry or wet base-course material 10D or 10W is charged to a prescribed thickness into the remaining spaces 6 and on top of the pattern-course materials 9R and 9B. Alternatively, as shown in FIG. 7, a thin layer of the dry or wet base-course material 10D or 10W is first charged throughout the main form, the bristling form 5 is disposed at a prescribed position within the main form, the pattern-course materials 9R and 9B are then charged to a prescribed thickness into the space 6 defined by the prescribed number of projections of the bristling form, and, finally, the base-course material 10D or 10W is charged to a prescribed thickness into the remaining space 6 of the bristling form. Alternatively, a thin layer of the dry or wet base-course material is charged throughout the base form, then the dry pattern-course material is charged into the space defined by some of the projections of the bristling form 5 placed outside the main form 4 and the base-course material is charged into the space defined by the remaining projections, the bristling form is covered with a sheet or plate member (not shown), turned upside down with the charged materials held stable, and placed on the thin layer within the main form while the sheet or plate member is removed. In this case, the sheet or plate member desirably has a surrounding frame in order to make it easy to turn the bristling form upside down. When a thin or water-soluble surrounding frame is used, it is unnecessary for it to be removed. Similarly when the sheet or plate member is made of a water soluble material, it is unnecessary to be removed. In this case, the bristling form may be removed before the materials are pressure formed.

As shown in FIG. 8, for producing the raw product for the ceramic shaped article shown in FIG. 3, a dry pattern-course material 9W which becomes white upon sintering and is thus appropriate for representing the snow covered peak of a mountain is charged into the corresponding space of the bristling form 5, a dry pattern-course material 9Br which becomes brown upon sintering and is thus suitable for representing the side of the mountain is charged into the corresponding space, a dry pattern-course material 9B which becomes blue upon sintering and is thus suitable for representing the sea is charged into the corresponding space, and a dry pattern-course material 9S which becomes sky-blue upon sintering and is thus suitable for representing the sky is charged into the corresponding space of the bristling form 5. These materials are all charged to a thickness less than that of the raw product for the shaped article. Next, a dry or wet base-course material 10D or 10W is charged throughout the interior of the main form in such amount as to obtain a raw product of the desired thickness. Alternatively, the base-course material 10D or 10W can first be charged throughout the interior of the main form and the dry pattern-course materials 9W, 9Br, 9B and 9S can be thereafter charged into the corresponding spaces of the bristling form 5.

The bristling form 5 has a size conforming to the inside size of the main form 4 in the illustrated embodiment. However, it may have a size slightly larger than the outer configuration of a pattern to be formed. In other words, the size of the bristling form does not necessarily conform to the inside size of the main form. If the formation of steps on the surface of a shaped article to be obtained, resulting from the presence of the support member of the bristling form, should be undesirable, a water soluble support member may be used.

The pattern-course and base-course materials are charged into the spaces defined by the projections manually or by means of an industrial robot and, in order to effect accurate and rapid charging, it is desired to use a mask having the same size as that of the bristling form and having an opening corresponding to a pattern to be formed.

To be specific, the pattern of the shaped articles 1 shown in FIGS. 1 and 2 comprises a red portion and a blue portion and, therefore, as shown in FIG. 4, a mask 7*a* having an opening R corresponding to the red portion and a mask 7*b* having an opening B corresponding to the blue portion are used. The two masks 7*a* and 7*b* have the same size as that of the bristling form 5 and are precisely aligned on the bristling form 5 to form a red and blue pattern.

To be specific, the pattern can be formed by placing one of the masks 7*a*, for example, on the surface of the bristling form 5, charging a pattern-course material 9R which becomes red upon sintering into the space defined by a prescribed number of projections through the opening R of the mask 7*a*, removing the mask 7*a*, then placing the other mask 7*b* on the surface of the bristling form 5, charging a pattern-course material 9B which becomes blue upon sintering in the space defined by a prescribed number of projections through the opening B of the mask 7*b*, and removing the mask 7*b*. A base-course material 10 which becomes white or gray upon sintering is then charged into the remaining space.

In the case where a dry base-course material 10D is used, water or a lubricant/bonding agent is appropriately supplied to all portions of the main form interior in such an amount as to obtain a water content or a lubricant/bonding agent content as required for press forming of the raw product. For controlling movement among the different materials or other such purposes, the water or lubricant/bonding agent can be supplied to specified regions in advance of other regions.

In the case where a wet base-course material 10W is used, if the water or a lubricant/bonding agent content thereof is higher than necessary, the excess water or lubricant/bonding agent is supplied to the dry pattern-course material. Where the water or a lubricant/bonding agent content of the base-course material and the pattern material is insufficient, additional water or lubricant/bonding agent can of course be added to these materials.

After charging the main form with the materials, the raw product for the ceramic shaped article is pressure formed and removed from the main form. After the removal, the support member alone or together with the projections is removed from the raw product. In the case of removing the support member alone, the projections are made of a material which becomes transparent upon sintering or are colored in advance with a pigment or colorant so as to be harmonized with the colors of the pattern-course materials thereby to obtain a good appearance.

The raw product thus obtained is sintered into a ceramic shaped article. Before sintering, the water content or lubricant/bonding agent content of the raw product can be adjusted and/or a glaze can be applied thereto.

In the case of using a main form having a bottom plate and a surrounding frame separable from each other, the bristling form is placed on the bottom plate and, as shown in FIGS. 5, 6 or 8, the pattern-course materials 9 and base-course material 10 are then charged into the corresponding spaces 6, whereafter the bristling form is turned upside down using a sheet or plate member. In this state, the bottom plate and the bristling form are successively removed and the charged materials are pressed with the surrounding frame to form a raw product. Before the pressing operation, the charged materials may be plasticized with water or a lubricant/bonding agent contained in the base-course material or supplied to one or both of the base-course material and the pattern-course materials. The raw product thus obtained is removed from the surrounding frame and sintered into a ceramic shaped article.

The pattern-course materials are charged beforehand into the corresponding spaces of the bristling form 5 disposed outside the main form, and the bristling form is covered with a sheet or plate member, turned upside down and placed within the main form as shown in FIG. 6 or FIG. 8. The sheet or plate member and the bristling form are removed depending on the circumstances, and the base-course material is then charged. All the materials are pressed to obtain a raw product. Before pressing the materials, the materials may be plasticized with water or a lubricant/bonding agent contained in the base-course material or supplied to one or both of the base-course material and the pattern-course materials. Otherwise, within the base form into which the base-course material has been charged in advance as shown in FIG. 7, the bristling form filled with the pattern-course materials and turned upside down is placed. Then, the materials are pressed after removal of the bristling form, thereby obtaining a raw product. Before the pressing operation, the materials may be plasticized with water or lubricant/bonding agent supplied to one or both of the base-course material or the pattern-course materials. The raw product thus obtained is removed from the main form and sintered. In turning the bristling form upside down, it is preferable to use a surrounding frame. The frame is removed if it is made of a water soluble material or it is unnecessary to remove if it is made of a water soluble material.

When the bristling form is removed, the materials separated by the projections 5*b* of the bristling form, which may be pattern-course materials on both sides or pattern-course material on one side and the base-course material on the other side, cave into and fill up the spaces left by the removal of the bristling form. At the time of removing the bristling form, it is preferable to vibrate one or both of the bristling form and the main form by use of a vibrator or ultrasonic waves as this regulates the cave-in action of the materials and thus promotes the filling in of the spaces formed by extraction of the bristling form. For the same purpose, after removal of the bristling form, it is preferable to subject all of them to pressure by means of a press.

When the pattern-course materials and the base-course material retain the content of water or lubricant-/bonding agent required for pressure forming after the removal of bristling form 5, they are pressed to obtain a raw product. After the removal of the bristling form, the materials are adjusted before sintering to have the predetermined content of water or lubricant/bonding agent by drying or by applying glaze to the raw product depending on the circumstances. In the case where the raw product to be sintered is made of a soluble material such as glass, it is accommodated in a mold such as a fire-proof setter and subjected to fusion or melt sintering. As a result, there is obtained a ceramic shaped article in the form of the inside shape of the setter.

When the bristling form 5 is made of a water soluble material such as water soluble fiber, the method using the water soluble bristling form is substantially the same as that in the embodiments using an insoluble bristling form, the only difference being that there is no need for removing the bristling form from the main form since the bristling form is dissolved so that the materials that were separated by the projections of the bristling form 5 (which may be pattern-course materials on both sides or a pattern-course material on one side and the base-course material on the other) cave into and fill up the spaces left by the dissolution of the bristling form. For promoting this cave-in action, the materials can be subjected to vibration and/or pressure.

If it is desirable for the bristling form to dissolve at an early stage, this can be realized by supplying water to the pattern-course materials immediately after charging of these materials has been completed, and thereafter charging the base-course material. In this case, if a dry base-course material is used, the amount of water supplied thereto after it is charged is made less than it would otherwise be. If it is desirable to charge a wet base-course material in advance of the pattern-course materials, there is used a bristling form made of a water soluble material that takes a relatively long time to dissolve because, otherwise, the bristling form is liable to dissolve before the charging of the pattern-course material can be completed.

Since the bristling form dissolves within the main form and does not have to be removed, it is preferable to give its projections a height equal to the thickness of the pattern-course materials to be charged therein. Specifically, there is no need for them to project above the upper surface of the main form.

In any of the aforesaid methods of producing a ceramic shaped article, the materials can be charged at higher density and as more finely packed by placing the main form on a table vibrator and subjecting it to vibration during the charging of both the pattern-course materials and the base-course material. The density of the charged materials thus can be enhanced. FIG. 9 shows a case in which a thick, compressible mat 8 of non-woven fabric or the like is laid on the floor of the main form 4 and the bristling form 5 having a water permeable support member 5*a* is placed on top of the mat. With this arrangement, the mat 8 will absorb any excess water and lubricant/bonding agent when the materials are charged and work to ensure that the water and lubricant/bonding agent contents of the different materials is maintained uniform, thereby promoting degassing of the materials during pressing so as to enhance the forming and molding properties of the raw product.

While the raw product produced in the manner of FIG. 9 is similar to that of the embodiment of FIG. 5. Similar results can be obtained by the use of a mat 8 in the embodiments of FIGS. 6 to 8. On the other hand, in the case of FIG. 7 in which the pattern-course materials are charged on top of the previously charged base-course material, a water or oil absorbing mat can be laid on the top surface of the raw product or on the floor of the main form. This will ensure that the water and lubricant/bonding agent contents of the different materials is maintained uniform and thus promote degassing of the materials during pressing, which in turn enhances the forming and molding properties of the raw product.

The method of producing a glass shaped article differs from the method of producing a ceramic shaped article in that a raw product is formed by applying pressure to the pattern-course material 9 and the base course material 10 in the latter method, whereas in the former method the materials charged into a bristling form within a refractory setter are thermally melted or fused within the refractory setter and allowed to set into an integral mass and the integral mass is removed from the setter.

In the method of producing a glass shaped article, the dry pattern-course material 9 consists mainly of one or more of glass particles, glass granules and glaze materials and may additionally include at least one of a pigment and a colorant. The material may be one which has absorbed some water or a lubricant/bonding agent after drying but is not kneaded with water and is in a state readily amenable to pulverization before charging. The base-course material 10 consists mainly of one or more of glass particles, glass granules and glaze particles and may additionally include at least one of a pigment and a colorant. In the finished state, however, it is required to differ from the pattern-course material in color, luster, texture and the like. Furthermore, it may be dry similarly to the pattern-course material or can be in the form of a slurry obtained by kneading with water or a lubricant/bonding agent. In addition to the aforementioned components, both the pattern-course material and the base-course material may, as found necessary, further have mixed therewith one or more of inorganic hollow micro-spheres including Shirasu (i.e., pumice ejected from volcanoes and the secondary deposit of such pumice) balloons, and particles or granules of new ceramic, metal and ore. They may also contain various additives of foaming agents, fluidization preventing agents, supernatant agents, lubricating agents, bonding agents, close-contact promoting agents, smoothing agents, matting agents and the like.

In producing a glass shaped article using the aforementioned pattern-course and base-course materials 9 and 10, there is used a bristling form 5 having projections 5*b* made of either a material insoluble in water or lubricant/bonding agent, such as metal, plastic, rubber, wood, paper, knit fabric, non-woven fabric or fiber or a material soluble in water or lubricant/bonding agent. In the case of the bristling form 5 having the insoluble projections 5*b*, a support member 5*a* alone or together with the projections 5*b* is removed from the shaped article. However, in the case of removing the support member alone, it is desirable that the support member be made of a material soluble in water or lubricant-/bonding agent, that the projections be constructed or made of a material such that they can easily be cut off the support member or that an adhesive agent for attaching the projections to the support member be made soluble in water or lubricant/bonding agent. In the case of removing the support member together with the projections, the projections desirably have tapered ends so that easy removal thereof from the shaped article can be attained. In the case where the bristling form is accommodated in the main form as held upside down after the materials have been charged or the case where a meshed sheet bristling form is used, the materials may be thermally melted or fused to produce a glass shaped article after the bristling form has been removed. In removing the bristling form by extracting the projections from the shaped material, one or both of the main form and the bristling form are caused to vibrate by a vibrator or with ultrasonic waves to promote the cave-in and filling-up action of the materials for the space left by the removal of the projections. When the bristling form has projections made of a soluble material such as glass fiber or the like and has a support member made of a soluble non-woven fabric or knit fabric material, it may be melted along with the materials without need of removing it. When it is made of a combustible material such as paper or the like, it can be burnt so as to disappear.

The materials are charged so as to produce a shaped article having a uniform thickness. They can be charged in any desired order. After the charging, the bristling form is solved if it is made of a soluble material or is removed from the main form if it is made of an insoluble material. Then the materials within the main form are thermally melted or fused into an integral mass. The integral mass is then removed from the main form. Further, by supplying an existing shaped article such as glass or iron plates into the main form and melting or fusing the shaped article together with the charged materials within the main form, there can be obtained a stained glass or enameled shaped article.

Where the shaped article is to be constituted of artificial stone, the aggregate used as the pattern-course material may, for example, be constituted of one or more of gravel, pieces of rock, ceramic, new ceramic, glass, plastic, wood, metal and other such pieces, with or without a pigment.

The aggregate used as the base-course material may, for example, be constituted of one or more of gravel, pieces of rock, ceramic, new ceramic, glass, and plastic, with or without a pigment added thereto. In the finished state it is required to differ from the pattern-course material in color, luster, texture and the like.

As the material for causing the pattern-course aggregate and the base-course aggregate charged into the bristling form to set there can be used a blended combination of cement powder and water, of cement powder, resin and water, or of resin and water or solvent. Moreover, any of these combinations may further include as blended therewith a powder of one or more of rock, ceramic, new ceramic, glass, plastic pigment and colorant. If required, the material may further have blended therewith any of various powders, granules or fibers and/or any of various additives.

The aforesaid powders and granules include powders and granules of slag, fly ash, fine light-reflecting particles or other such substances. Usable fibers include metal fibers, carbon fibers, synthetic fibers, glass fibers and the like. Usable additives include shrink proofing agents, congealing and setting agents, delaying agents, water proofing agents, inflating agents, water reducing agents, fluidizing agents and the like.

If necessary for enhancing the adherence of the setting material with the pattern-course aggregate and the base-course aggregate, these materials can be sprayed with or immersed in water, solvent or surface treatment agent.

The method for producing an artificial stone shaped article using the aforesaid pattern-course aggregate, base-course aggregate and setting material will now be explained. Where the projections 5*b* of the bristling form 5 are made of metal, plastic, rubber, wood, paper, knit fabric woven fabric, non-woven fabric, fiber or other such water or solvent insoluble material, the support member 5*a* alone or along with the projections 5*b* is removed from the shaped article when the charged materials have set to a certain extent. However, in the case of removing the support member 5*a* alone, it is desirable that the support member 5*a* be made of a water or solvent soluble material, that the projections 5*b* be constructed or made of a material such that they can easily be cut off the support member 5*a*, or that an adhesive agent for attaching the projections 5*b* to the support member 5*a* be made soluble in water. In the case of removing the support member 5*a* along with the projections 5*b*, the projections 5*b* desirably have tapered ends so that easy removal thereof from the shaped article can be attained. In the case where the bristling form is placed in the main form as held upside down or has a netted support member, the setting material may be charged for setting the charged materials after the removal of the bristling form. The bristling form can be completely removed by vibrating one or both of the main form and the bristling form with a vibrator or ultrasonic oscillator. This can also promote the filling-in of the spaces formed by extraction of the projections.

Where a sheet bristling form is used, by warping the form in the direction of widening the spaces between the projections to positively form gaps between the materials and the projections, it is possible to remove the bristling form more quickly.

For using the pattern-course aggregate and the base-course aggregate to produce an artificial stone shaped article as shown in FIG. 1, a red pattern-course aggregate 9R is charged into the space 6 corresponding to the circle portion and a straight line portion diagonally intersecting the circle within the bristling form 5 disposed inside the main form 4, a blue pattern-course aggregate 9B is charged into the space 6 corresponding the portion enclosed by the circle and straight line portions, and a dry or wet base-course aggregate 10D or 10W is charged into the the space 6 corresponding to the portion outside of the circle portion within the bristling form 5. All of the materials are charged to the same thickness. They can be charged in any desired order.

As shown in FIG. 6, for producing an artificial stone shaped article as shown in FIG. 2, pattern-course aggregates 9R and 9B are charged into the space 6 of the bristling form 5 within the main form 4 to a thickness that is less than the overall thickness of the product, whereafter a base-course aggregate 10 is charged to a prescribed thickness both in the remaining space 6 of the bristling form 5 and on top of the pattern-course aggregates 9R and 9B. Alternatively, as shown in FIG. 7, a thin layer of the base-course aggregate 10 is first charged throughout the main form, the pattern-course aggregates 9R and 9B are then charged to a prescribed thickness into the space defined by some of projections of the bristling form, and finally, the base-course aggregate 10 is charged to a prescribed thickness into the remaining space of the bristling form. Alternatively, a thin layer of the dry or wet base-course aggregate is charged throughout the base form, then the dry pattern-course aggregate is charged into the space defined by some of the projections of the bristling form placed outside the main form and the base-course aggregate is charged into the space defined by the remaining projections, the bristling form is covered with a sheet or plate member (not shown), turned upside down with the charged aggregates held stable, and placed within the main form while the sheet or plate member is removed. In this case, the sheet or plate member desirably has a surrounding frame in order to make it easy to turn the bristling form upside down. When a thin or water-soluble surrounding frame is used, it is unnecessary to be removed. Similarly when the sheet or plate member is made of a water soluble material, it is unnecessary to be removed. In this case, the bristling form may be removed before charging of the setting material.

As shown in FIG. 8, for producing an artificial stone the shaped article as shown in FIG. 3, white pattern-course aggregate 9W for representing the snow covered peak of a mountain is charged into the corresponding space 6 of the bristling form 5, a brown pattern-course aggregate 9Br for representing the side of the mountain is charged into the corresponding space, a blue pattern-course aggregate 9B for representing the sea is charged into the corresponding space, and a sky-blue pattern-course aggregate 9S for representing the sky is charged into the corresponding space of the bristling form 5. These aggregates are all charged to a thickness less than that of the final product shaped article to be produced. Next, a base-course aggregate 10 is charged throughout the interior of the main form in such amount as to obtain a final shaped article product of the desired thickness. Alternatively, the base-course aggregate 10 can first be charged throughout the interior of the main form and the pattern-course aggregates 9W, 9Br, 9B and 9S thereafter be charged into the corresponding spaces of the bristling form 5.

The bristling form 5 has a size conforming to the inside size of the main form 4 in the illustrated embodiment. However, it may have a size slightly larger than the outer configuration of a pattern to be formed. In other words, the size of the bristling form does not necessarily conform to the inside size of the main form. If the formation of steps on the surface of a shaped article to be obtained, resulting from the presence of the support member of the bristling form, should be undesirable, a water soluble support member may be used.

The pattern-course and base-course aggregates are charged into the spaces defined by the projections manually or by means of an industrial robot and, in order to effect accurate and rapid charging, it is desired to use a mask having the same size as that of the bristling form and having an opening corresponding to a pattern to be formed.

To be specific, the pattern of the shaped articles 1 shown in FIGS. 1 and 2 comprises a red portion and a blue portion and, therefore, as shown in FIG. 4, a mask *7a* having an opening R corresponding to the red portion and a mask *7b* having an opening B corresponding to the blue portion are used. The two masks *7a* and *7b* have the same size as that of the bristling form 5 and are precisely aligned on the bristling form 5 to form a red and blue pattern.

To be specific, the pattern can be formed by placing one of the masks *7a*, for example, on the surface of the bristling form 5, charging a red pattern-course aggregate 9R into the space defined by a prescribed number of projections through the opening R of the mask *7a*, removing the mask *7a*, then placing the other mask *7b* on the surface of the bristling form 5, charging a blue pattern-course aggregate 9B in the space defined by a prescribed number of projections through the opening B of the mask *7b*, removing the mask *7b*, and charging the base-course aggregate 10 into the space defined by the remaining projections. Thus, by the use of the masks the materials can easily be charged rapidly into the spaces with exactitude.

The setting material is charged throughout the voids of the charged aggregates. When it is desired to adjust the movement of the aggregates, the setting material may be charged in advance in a prescribed amount. A mixture of the setting material and the base-course aggregate may be used. The charging of the setting material can be carried out by vacuum charging. After the charged aggregates have set into a shaped article, the article is removed from the main form and, depending on the circumstances, the support member of the bristling form alone or together with the projections is removed from the article. When the support member alone is removed, it is desirable to color the projections in advance so as to be harmonized with the colors of the pattern to be formed.

In the case of using a main form having a bottom plate and a surrounding frame separable from each other, the bristling form is placed on the bottom plate and, as shown in FIGS. 5, 6 or 8, the pattern-course aggregates and base-course aggregate are then charged into the corresponding spaces, whereafter the bristling form is turned upside down using a sheet or plate member. In this state, the bottom plate and the bristling form are successively removed and the charged materials are set into a raw product. The raw product thus obtained is removed.

The pattern-course aggregates are charged beforehand into the corresponding spaces of the bristling form 5 disposed outside the main form, and the bristling form is covered with a sheet or plate member, turned upside down and placed within the main form as shown in FIG. 6 or FIG. 8. The sheet or plate member and the bristling form are removed depending on the circumstances, and the base-course aggregate and setting material are then charged to obtain an artificial stone shaped article. Otherwise, within the base form into which the base-course aggregate has been charged in advance, the bristling form filled with the pattern-course materials and turned upside down is placed. Then, after removal of the bristling form, the setting material is further charged to obtain an artificial stone shaped article by removing it from the main form. In turning the bristling form upside down, it is preferable to use a surrounding frame. The frame is removed if it is made of a water soluble material or is unnecessary to be removed if it is made of a water soluble material.

The support member of the bristling form may remain integral with the artificial stone shaped article so as to serve as a reinforcing material. When the support member is netted, it may be integral with the artificial stone shaped article so as to serve as an inside reinforcing material.

In the case where the bristling form is constituted of a material soluble in the setting material, such as soluble fiber, there is no need for the steps of removing the bristling form 5 and separating the projections 5*b* from the support member 5*a*.

Aside from this difference, the method of producing a shaped article using a soluble bristling form is substantially the same as that in the aforesaid embodiment using an insoluble bristling form. When the bristling form dissolves, the aggregates that were separated by the projections of the bristling form (which may be pattern-course aggregates on both sides or a pattern-course aggregate on one side and the base-course aggregate on the other) cave into and fill up the spaces left by the dissolution of the bristling form. For promoting this cave-in action, the materials can be subjected to vibration and/or pressure.

If it is desirable for the bristling form to dissolve at an early stage, this can be realized by supplying setting material to the pattern-course aggregates immediately after charging of these aggregates has been completed, and thereafter charging the base-course aggregate. In this case, the amount of setting material subsequently charged is reduced. If it is desirable to charge base-course aggregate precharged with setting material in advance of the pattern-course aggregates, there is used a bristling form made of a soluble material that takes a relatively long time to dissolve because, otherwise, the bristling form is liable to dissolve before the charging of the pattern-course aggregates can be completed.

Since the bristling form dissolves within the main form and does not have to be removed, it is preferable to give its projections a height equal to the thickness of the pattern-course aggregates to be charged therein. Specifically, there is no need for them to project above the upper surface of the main form.

In the aforesaid method of producing an artificial stone shaped article, the aggregates can be charged with a higher density and as more finely packed by placing the main form on a table vibrator and subjecting it to vibration during the charging of both the pattern-course aggregates and the base-course aggregate. FIG. 9 shows a case in which a water or oil absorbing mat 8 of non-woven fabric or the like is laid on the floor of the main form 4 and the bristling form 5 having a liquid permeable support member 5*a* is placed on top of the mat 8 before charging of the aggregates. The mat 8 will absorb any excess water or solvent and work to ensure that the water content of the different aggregates is maintained uniform, thereby promoting degassing of the aggregates during pressing so as to enhance the forming and molding properties of the shaped article product.

The artificial stone shaped article produced in the manner of FIG. 9 is similar to that of the embodiment of FIG. 5. It is also possible to obtain the same results if the mat 8 is used in the embodiments of FIGS. 6 and 8. In the case of FIG. 7, on the other hand, since the pattern-course aggregates are charged on top of the previously charged base-course aggregate, it is preferable to lay a water or oil absorbing mat on the floor of the main form to ensure that the water or solvent content of the aggregates is maintained uniform, thereby promoting degassing during pressing so as to enhance the forming and molding properties of the shaped article product.

In any of the above individually explained methods for producing a concrete shaped article, a ceramic shaped article, a glass shaped article or an artificial stone shaped article, a main form may be constituted of a deformable material. This can produce patterned shaped articles of other than block-like configuration by deforming the main form after charging of the pattern-course materials 9 and base-course material 10 and setting these materials within the deformed main form.

Figure 13:
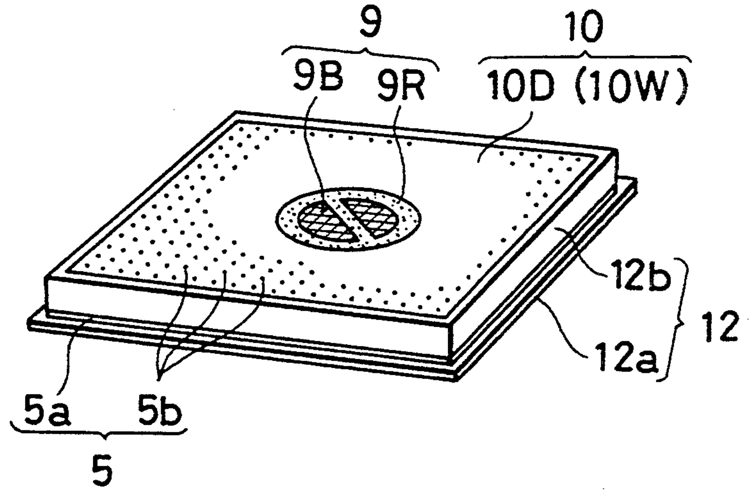
FIG. 13 is an explanatory perspective view of the first step of the method of the invention for producing a cylindrical shaped article.
Figure 14:
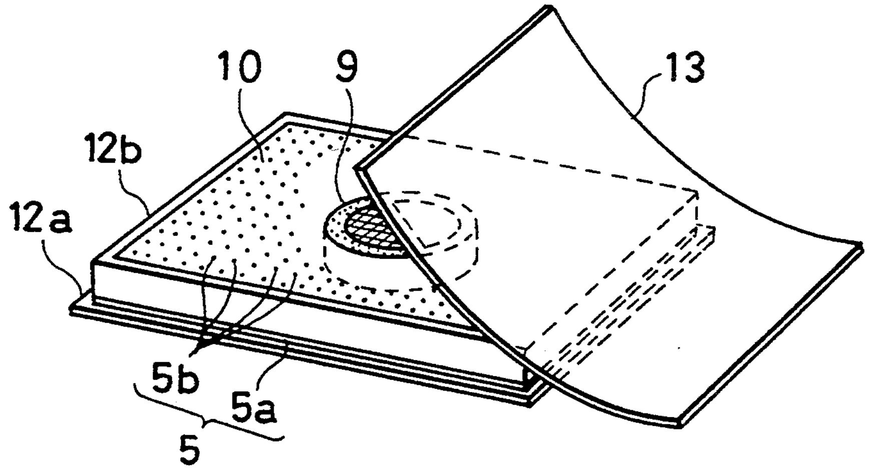
FIG. 14 is an explanatory perspective view of the second step of the method of the invention of FIG. 13.
Figure 15:
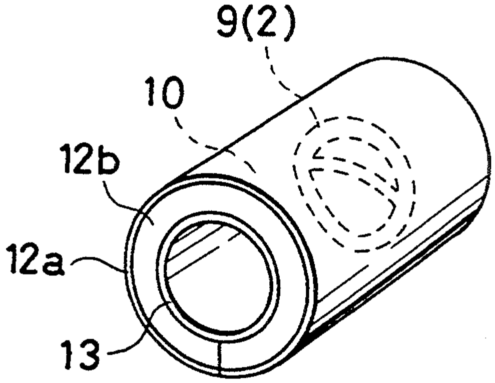
FIG. 15 is an explanatory perspective view of the third step of the method of the invention of FIG. 13.

FIGS. 13 to 15 illustrate an embodiment for producing a cylindrical shaped article. A peripheral frame **12*b* of the main form 12 is constituted of a deformable material, such as urethane rubber, and a coilable bottom sheet 12*a* of the main form 12 is made of a sheet of metal, plastic, paper, non-woven fabric, knit fabric or woven fabric, rubber or the like. The peripheral frame 12*b* is set on the bottom sheet 12*a* and a bristling form 5 having a deformable support member 5*a* is disposed at a prescribed position within the area surrounded by the peripheral frame 12*b*. Optionally, the bottom sheet 12*a* may be used concurrently as the bottom sheet of the main form 12 and as the support member 5*a* of the bristling form 5. In the same manner as in FIG. 5, dry pattern-course materials 9R and 9B and a dry or wet base-course material 10D or 10W are charged into the spaces defined by a prescribed number of projections 5*b* of the bristling form 5 (FIG. 13). After congelation of the two types of materials, the area within the peripheral frame 12*b* is covered with a coilable auxiliary sheet 13 similar to the bottom sheet 12*a* (FIG. 14). The two types of materials within the area surrounded by the peripheral frame 12*b* are coiled together with the peripheral frame, as sandwiched between the bottom sheet 12*a* and the auxiliary sheet 13 (FIG. 15). The two types of materials are maintained in the rolled-up state until they set, whereby there is obtained a cylindrical shaped article having a pattern course 2** exposed at a desired position thereof. (Where ceramic materials are used, there is obtained a raw product which is thereafter sintered into the final patterned shaped article.)

Figure 16:
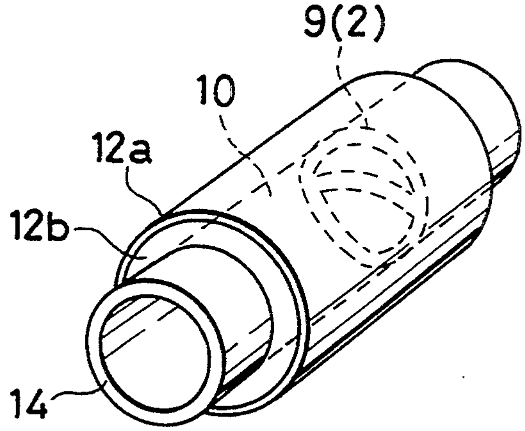
FIG. 16 is an explanatory perspective view of the third step of the method of the invention for producing another cylindrical shaped article.
Figure 17:
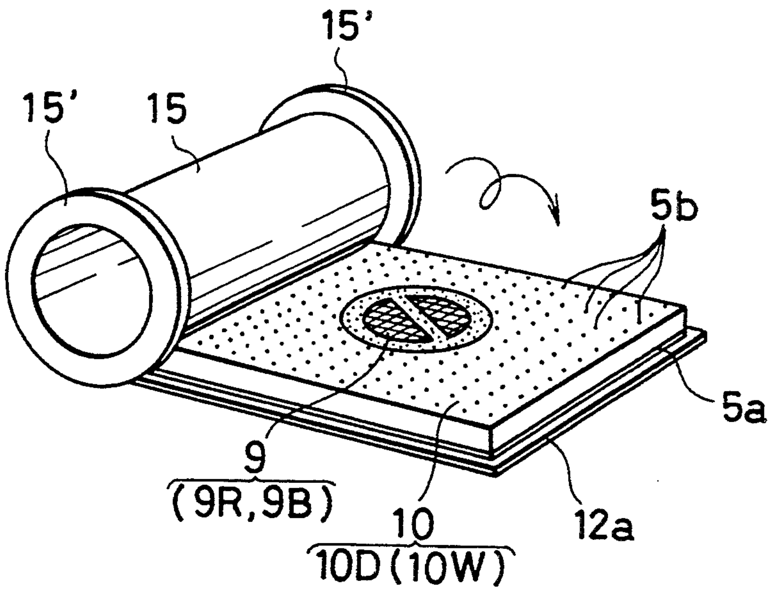
FIG. 17 is an explanatory perspective view of the second step of the method of the invention for producing another cylindrical shaped article.

In the example shown in FIG. 16, the pattern-course materials and the base-course material are charged in the same way as in the case of FIG. 13. After they have been brought to a deformable state owing to their congelation etc., they are wrapped around a die 14 matched to the internal shape of the cylindrical shaped article to be produced (cylindrical in the case of a cylindrical shaped article product) and are held wrapped therearound until they have set into a cylindrical shaped article. In this case, since the surfaces of the pattern-course and base-course materials exposed on the upper side within the peripheral frame **12*b* are held in contact with the outer surface of the die 14, the auxiliary sheet 13 can be omitted. Use of a polygonal die 14** makes it possible to produce a cylindrical shaped article having a polygonal sectional configuration.

In the wrapping or coiling method illustrated in FIGS. 15 and 16, when the opposite ends of the peripheral frame **12*b* come into contact, a seam occurs between the opposite edges of the base-course material. One way of coping with this problem is to slightly overlap the opposite ends of the peripheral frame so as to form a double layer of the base-course material at the seam. Another is to cut away the opposite ends of the peripheral frame 12*b*** so that the thus opposite exposed edges of the base-course material can be brought into abutment for preventing the formation of a space at the seam.

Figure 18:
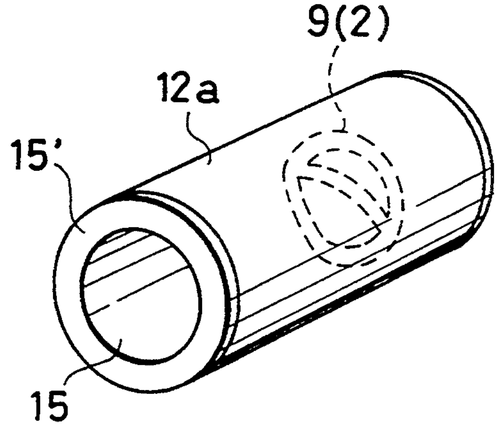
FIG. 18 is an explanatory perspective view of the third step of the method of the invention of FIG. 17.

In a similar manner, it is further possible to produce a cylindrical shaped article by charging the pattern-course materials and the base-course material into the main form 12 in the manner of FIG. 13, removing the peripheral frame **12*b* after the charged materials have been brought to a deformable state owing to their congelation etc., wrapping them together with the bottom sheet 12*a* onto a die 15 matched to the internal shape of the cylindrical shaped article to be produced and having a flange 15' at either end, and maintaining the two types of materials in the rolled-up condition until they set (FIG. 18). As in the case of FIG. 16, the inside length of the peripheral frame 12*b* is of course made the same as the outer circumference of the die 15 and the width thereof is made equal to the distance between the flanges 15'. It is again possible to omit the use of the auxiliary sheet 13 and possible to produce a cylindrical shaped article having a polygonal sectional configuration by using a polygonal die 15**.

While the foregoing description relates to the production of a cylindrical shaped article, it is also possible by partially or totally deforming the main form to produce shaped articles of other than cylindrical configuration.

Figure 19:
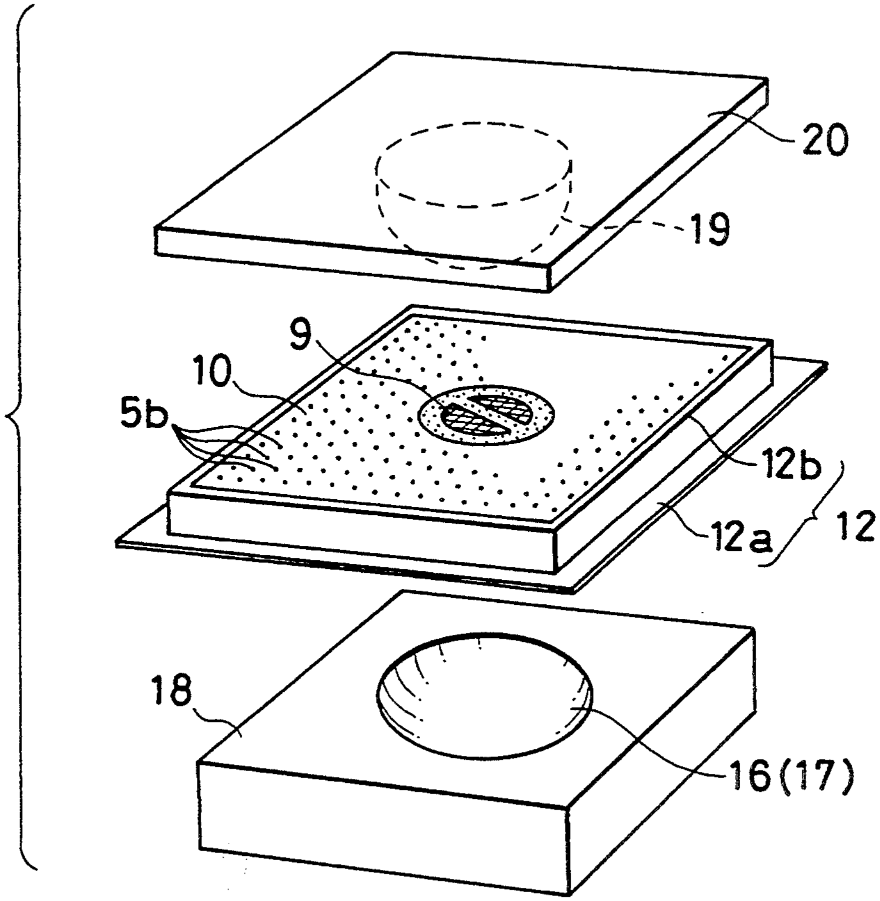
FIG. 19 is an explanatory perspective view of the first step of the method of the invention for producing a shaped article having a local recess.
Figure 20:
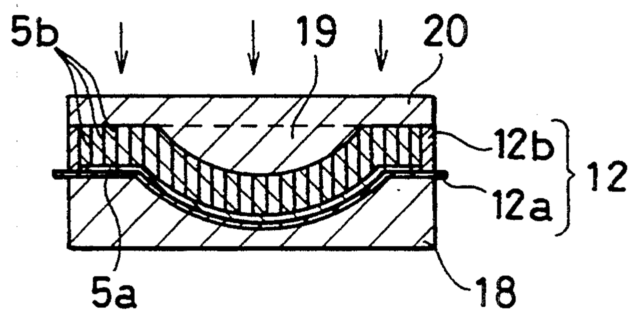
FIG. 20 is a sectional view of the second step of the method of the invention of FIG. 19.

For example, a shaped article with a downwardly bulged configuration can be produced by charging the pattern-course materials 9 and the base-course material 10 into the main form 12 in the manner of FIG. 13, placing the result on a lower die 18 whose upper surface is formed with a recess 16 filled with gel 17, as shown in FIG. 19, pressing it from above with an upper die 20 having a protuberance 19 complementary to the recess 16 (FIG. 20), thus causing its upper surface to be depressed by the protuberance 19 and its lower surface to be pushed into the recess 16. In this case, since only part of the bottom sheet **12*a* is deformed, the peripheral frame 12*b* need not be deformable. The purpose of the gel 17 in the recess 16 is to hold the portion of the bottom sheet 12*a* positioned over the recess 16 flat up to the time that pressure is applied by the upper die 20. With the start of pressure application by the upper die 20, the gel is caused to overflow from around the upper edge of the recess 16 as a result of the intrusion into the recess 16 of the bottom sheet and the material resting thereon. Alternatively, the lower die 18 can be formed of clay or other plastic material. In this case, since the plastic lower die will be depressed by the pressure of the upper die so as to form the recess 16, there is no need to use the gel 17**.

Figure 21:
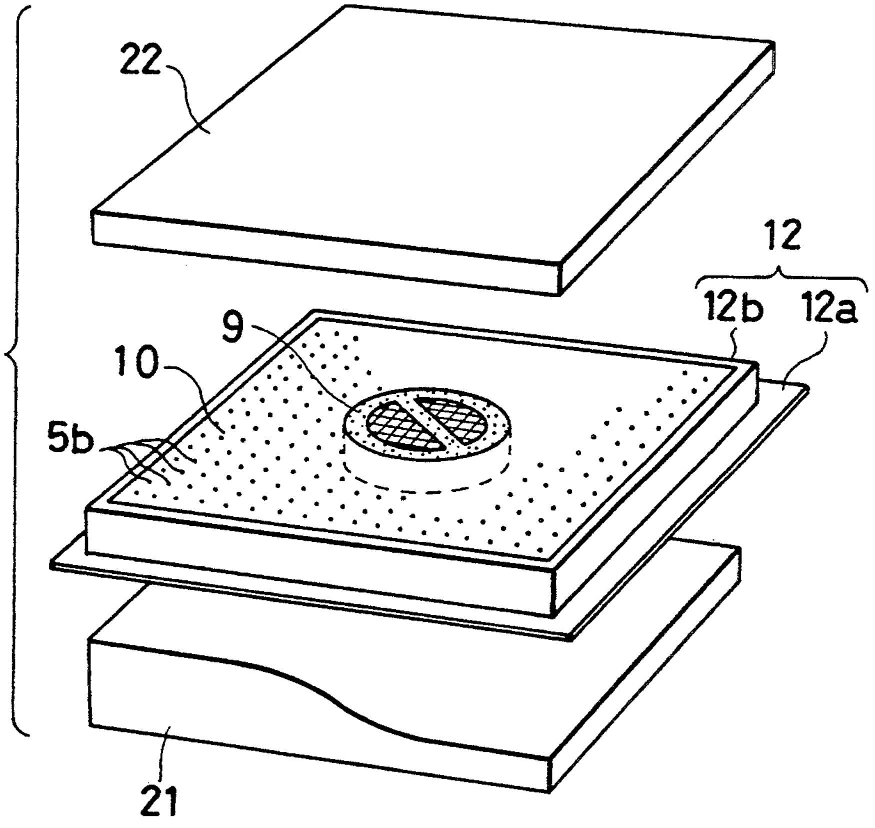
FIG. 21 is an explanatory perspective view of the first step of the method of the invention for producing a tile-like shaped article.
Figure 22:
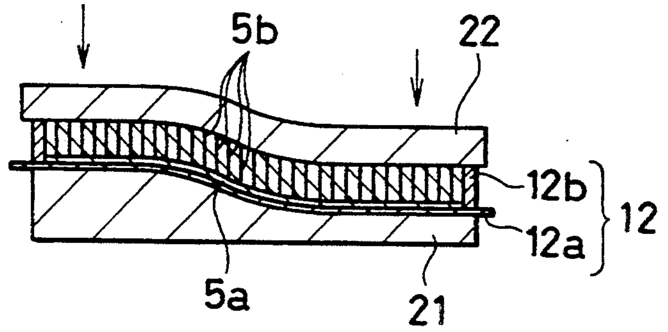
FIG. 22 is a sectional view of the second step of the method of the invention of FIG. 21.

Further, a roof tile-like shaped article can be produced by charging the pattern-course materials and the base-course material into the main form 12 in the manner of FIG. 13, placing the result on a lower die 21 having a rised-and-sunken upper surface, as shown in FIG. 21, pressing it from above with a flat elastic plate 22 (FIG. 22), thus causing the main form 12 and both types of materials contained therein to be deformed in accordance with the contour of the lower die 21. In this case, while it is possible to constitute the main form 12 of a peripheral frame 12*b* and a bottom sheet 12*a* laid on the bottom thereof, it is also possible to use a main form 12 that is closed at the bottom by providing the peripheral frame 12*b* with a deformable floor.

The strength of the shaped article obtained by the foregoing process can be enhanced by disposing a reinforcing material in the main form before charging the materials into the main form. Reinforcing material usable for this purpose include fibers and filaments of metal and other materials, steel rods, lath screen, expandable metal, and various types of ropes and wires.

In any of the foregoing methods for producing a shaped article, pressure may be applied to the interior of the main form when the base-course material and the pattern-course materials within the main form are subjected to integral setting, and one or both of the main form and the bristling form may be vibrated by a vibrator or with ultrasonic waves either when the base-course and pattern-course materials are charged or when the bristling form is removed from the main form.

Where a sheet bristling form is used, by warping the form in the direction of widening the spaces between the projections to positively form gaps between the materials and the projections, it is possible to remove the bristling form more quickly. Conversely, by warping the form in the direction of narrowing the spaces between the projections, it is possible to firmly retain the materials in the spaces.

Use of a water-absorbing or oil-absorbing mat such as shown in FIG. 9 is advantageous in that the mat absorbs excess water, lubricant/bonding agent and solvent from portions containing an excess amount of these and supplies them to portions which are deficient in them, thus ensuring uniform water, lubricant/bonding agent and solvent content throughout the shaped article and also reducing the surface water (solvent)-to-cement (resin) ratio so as to promote degassing at the time of pressing. The result is a product of better performance.

As explained in the foregoing, the invention makes it possible to easily produce a patterned concrete shaped article, a patterned ceramic shaped article, a patterned glass shaped article or a patterned artificial stone shaped article with a pattern course that is exposed over part or the whole of its surface. Since the pattern is formed to a substantial depth below the surface of the shaped article, it does not wear off or become unsightly even when material is removed from the surface of the shaped article by abrasion. The invention further makes it possible to produce a thick shaped article and then slice it into a number of thin shaped articles having the same pattern.

As the pattern course is formed by charging dry pattern-course material into the space defined by the projections of the bristling form disposed within the main form, the materials can be densely charged without leaving undesirable voids. A clear pattern can be obtained by coloring beforehand the projections remaining in a shaped article so as to be harmonized with the color of the pattern course. Moreover, the pattern-course and base-course materials cave into and fill up the spaces left by removal or dissolution of the projections, so that the boundaries between the pattern course and the base course are clear-cut and the pattern as a whole is very sharply defined.

It is also possible to positively disturb the charged materials either at the boundaries between them or as a whole after the pattern-course material and the base-course material have been charged into the bristling form, and then the bristling form is removed. Doing this enables the production of shaped articles which resemble marble and other kinds of natural stone. Further, by appropriately selecting the grain size and charging ratio of each charged pattern-course material it is possible to obtain a porous and water permeable pattern course, by appropriately selecting the grain size and charging ratio of each charged base-course material it is possible to obtain a porous and water permeable base-course, and by appropriately selecting the grain size and charging ratio of both types of materials it is possible to obtain a porous and water permeable shaped article. In producing a ceramic shaped article, use of a light transmittable material will result in a light transmittable, patterned, ceramic shaped article, whereas fusion or melt sintering of a melting material will results in a patterned, crystallized, glass shaped article.

Obviously, numerous modifications and variations of the present invention are possible in light of the above teachings. It is therefore to be understood that within the scope of the appended claims, the invention may be practiced otherwise than as specifically described herein.

What is claimed is:

1. A method for producing a patterned shaped article, comprising:

disposing, at a prescribed position within a main form of a predetermined height for molding the patterned shaped article, a projection-bristing form having a support member and a plurality of projections of a height not greater than said predetermined height of said main form; said projections standing upright from the support member at a prescribed density per unit area and having spaces formed therebetween;

charging a prescribed amount of dry pattern-course material for forming a pattern course of the patterned shaped particle into a plurality of the spaces defined by a prescribed number of the projections of the projection-bristling form;

charging a base-course material for forming a base course of the patterned shaped article into the main form including remaining spaces of the projection-bristling form not filled with the pattern-course material;

removing the projection-bristling form;

causing the charged pattern-course material and charged base-course material to set into the patterned shaped article; and removing the patterned shaped article from the main form.

2. A method of producing a patterned shaped article according to claim 1, wherein the pattern-course and base-course materials are charged through a mask having an opening corresponding to a pattern to be formed in the patterned shaped article.

3. A method of producing a patterned shaped article according to claim 1, wherein the plurality of projections standing upright from the support member are selected from the group consisting of pins, sticks, pipes and pieces.

4. A method of producing a patterned shaped article according to claim 1, wherein the plurality of projections standing upright from the support member are selected from the group consisting of standing fibers, filaments, pile and loops.

5. A method of producing a patterned shaped article according to claim 1, wherein the main form and the projection-bristling form comprise a deformable material.

6. A method of producing a patterned shaped article according to claim 5, wherein the deformable material is one member selected from the group consisting of natural rubber, synthetic rubber and plastic.

7. A method of producing a patterned shaped article according to claim 1, wherein the pattern-course material is at least one member selected from the group consisting of cement powder and resin; the base-course material is a mixture of fine aggregate and at least one member selected from the group consisting of cement powder and resin; and the patterned shaped article is a concrete shaped article.

8. A method of producing a patterned shaped article according to claim 1, wherein the pattern-course material is a mixture of (1) at least one member selected from the group consisting of cement powder and resin and (2) at least one member selected from the group consisting of a pigment and a fine aggregate; the base-course material is a mixture of a fine aggregate and at least one member selected from the group consisting of cement powder and resin; and the patterned shaped article is a concrete shaped article.

9. A method of producing a patterned shaped article according to claim 7 or 8, which comprises setting the pattern-course material and the base-course material charged by supplying water thereto.

10. A method of producing a patterned shaped article according to claim 9, wherein the projection-bristling form comprises a water-soluble material and which comprises removing the water-soluble material by dissolution thereof in the water supplied to the pattern-course material and the base-course material.

11. A method of producing a patterned shaped article according to claim 7 or 8, wherein the base-course material is a water-containing mixture of a fine aggregate and at least one member selected from the group consisting of cement powder and resin; and the pattern-course material and the base-course material are caused to set into a shaped article by the water contained in the base-course material.

12. A method of producing a patterned shaped article according to claim 11, wherein the projection-bristling form comprises a water-soluble material and is removed by dissolution thereof in the water contained in the base-course material.

13. A method of producing a patterned shaped article according to claim 7 or 8, wherein the charged pattern-course and base-course materials are bonded to an existing concrete surface before they set into the concrete shaped article.

14. A method of producing a patterned shaped article according to claim 1, wherein the pattern-course material is an aggregate, the base-course material is an aggregate, the patterned-course material and the base-course material charged are caused to set into a shaped article by charging a setting material into voids among the aggregates, and the shaped article is an artificial stone-shaped article.

15. A method of producing a patterned shaped article according to claim 14, wherein the projection-bristling form comprises a soluble material which is removed by dissolution thereof in water or by solvent contained in the setting material.

16. A method of producing a patterned shaped article according to claim 1, wherein the pattern-course material is at least one member selected from the group consisting of (i) clay, (ii) particles or granules of (a) rock, (b) glass or (c) ceramic and (iii) glaze particles; the base-course material is at least one member selected from the group consisting of (i) clay and (ii) particles or granules of (a) rock, (b) glass or (c) ceramic; the charged pattern-course material and base-course materials are pressed into a raw product; and the raw product is removed from the main form and sintered into a ceramic shaped article.

17. A method of producing a patterned shaped article according to claim 1, wherein the pattern-course material is a mixture of (1) at least one member selected from the group consisting of (i) clay, (ii) particles or granules of (a) rock, (b) glass or (c) ceramic and (iii) glaze particles and (2) at least one member selected from the group consisting of (iv) a pigment and (v) a colorant; the base-course material is at least one member selected from the group consisting of (i) clay and (ii) particles or granules of (a) rock, (b) glass or (c) ceramic; the charged pattern-course and base-course materials are pressed into a raw product; and the raw product is removed from the main form and sintered into a ceramic shaped article.

18. A method of producing a patterned shaped article according to claim 1, wherein the pattern-course material is at least one member selected from the group consisting of (i) clay, (ii) particles or granules of (a) rock, (b) glass or (c) ceramic and (iii) glaze particles; the base-course material is a mixture of (1) at least one member selected from the group consisting of (i) clay and (ii) particles or granules of (a) rock, (b) glass or (c) ceramic and (2) at least one member selected from the group consisting of (iv) a pigment and (v) a colorant; the charged pattern-course and base-course materials are pressed into a raw product; and the raw product is removed from the main form and sintered into a ceramic shaped article.

19. A method of producing a patterned shaped article according to claim 1, wherein the pattern-course material is a mixture of (1) at least one member selected from the group consisting of (i) clay, (ii) particles or granules of (a) rock, (b) glass or (c) ceramic and (iii) glaze particles and (2) at least one member selected from the group consisting of (iv) a pigment and (v) a colorant; the base-course is a mixture of (1) at least one member selected from the group consisting of (i) clay and (ii) particles or granules of (a) rock, (b) glass or (c) ceramic and (2) at least one member selected from the group consisting of (iv) a pigment and (v) a colorant; the charged pattern-course and base-course materials are pressed into a raw product; and the raw product is removed from the main form and sintered into a ceramic shaped article.

20. A method of producing a patterned shaped article according to claim 16 or 17, wherein the charged pattern-course and base-course materials are pressed into a raw product which contains water.

21. A method of producing a patterned shaped article according to claim 18 or 19, wherein the charged pattern-course and base-course materials are pressed into a raw product which contains water.

22. A method of producing a patterned shaped article according to claim 16 or 17, wherein the charged pattern-course and base-course materials are pressed into a raw product which contains a lubricant-bonding agent.

23. A method of producing a patterned shaped article according to claim 18 or 19, wherein the charged pattern-course and base-course materials are pressed into a raw product which contains a lubricant-bonding agent.

24. A method of producing a patterned shaped article according to claim 20, wherein the projection-bristling form comprises a soluble material and is removed by dissolution thereof in the water.

25. A method of producing a patterned shaped article according to claim 21, wherein the projection-bristling form comprises a soluble material and is removed by dissolution thereof in the water.

26. A method of producing a patterned shaped article according to claim 22, wherein the projection-bristling form comprises a soluble material and is removed by dissolution thereof in the lubricant-bonding agent.

27. A method of producing a patterned shaped article according to claim 23, wherein the projection-bristling form comprises a soluble material and is removed by dissolution thereof in the lubricant-bonding agent.

28. A method of producing a patterned shaped article according to claim 1, wherein the pattern-course material is a mixture of (1) at least one of glass particles and glass granules and (2) at least one of pigments and colorants and the base-course material is a mixture of (1) at least one of glass particles and glass granules and (2) at least one of pigments and colorants to produce a patterned glass shaped article.

29. A method of producing a patterned shaped article according to claim 1, wherein the pattern-course material is a mixture of (1) at least one of glass particles and glass granules and (2) at least one of pigments and colorants and the base-course material is at least one of glass particles and glass granules to produce a patterned glass shaped article.

30. A method of producing a patterned shaped article according to claim 1, wherein the pattern-course material is at least one of glass particles and glass granules and the base-course material is a mixture of (1) at least one of glass particles and glass granules and (2) at least one of pigments and colorants to produce a patterned glass shaped article.

31. A method of producing a patterned shaped article according to claim 28, wherein the main form is a refractory form having a prescribed shape, the charged materials are thermally melted within the refractory form into an integral mass and the integral mass is removed from the refractory form.

32. A method of producing a patterned shaped article according to claim 29, wherein the main form is a refractory form having a prescribed shape, the charged materials are thermally melted with the refractory form into an integral mass and the integral mass is removed from the refractory form.

33. A method of producing a patterned shaped article according to claim 30, wherein the main form is a refractory form having a prescribed shape, the charged materials are thermally melted within the refractory form into an integral mass and the integral mass is removed from the refractory form.

34. A method of producing a patterned shaped article according to claim 28, wherein the main form is a refractory form having a prescribed shape, the bristling form is removed from the refractory form, then the charged materials are thermally melted within the refractory form into an integral mass and the integral mass is removed from the refractory form.

35. A method of producing a patterned shaped article according to claim 29, wherein the main form is a refractory form having a prescribed shape, the bristling form is removed from the refractory form, then the charged materials are thermally melted within the refractory form into an integral mass and the integral mass is removed from the refractory form.

36. A method of producing a patterned shaped article according to claim 30, wherein the main form is a refractory form having a prescribed shape, the bristling form is removed from the refractory form, then the charged materials are thermally melted within the refractory form into an integral mass and the integral mass is removed from the refractory form.

* * * * *